United States Patent
Otomo

(10) Patent No.: US 11,998,846 B2
(45) Date of Patent: Jun. 4, 2024

(54) INSTRUCTIONS AND INFORMATION PROCESSING DEVICE FOR GAMING

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 17/885,215

(22) Filed: Aug. 10, 2022

(65) Prior Publication Data
US 2023/0226446 A1 Jul. 20, 2023

Related U.S. Application Data

(63) Continuation of application No. PCT/JP2021/004077, filed on Feb. 4, 2021.

(30) Foreign Application Priority Data

Feb. 10, 2020 (JP) .................................. 2020-020377

(51) Int. Cl.
*A63F 13/00* (2014.01)
*A63F 13/58* (2014.01)
*A63F 13/69* (2014.01)

(52) U.S. Cl.
CPC .............. *A63F 13/58* (2014.09); *A63F 13/69* (2014.09)

(58) Field of Classification Search
CPC .......... A63F 13/79; A63F 13/69; A63F 13/67; A63F 13/55
See application file for complete search history.

(56) References Cited

U.S. PATENT DOCUMENTS 9,808,719 B2 * 11/2017 Yamaguchi ............. A63F 13/58
2016/0206958 A1 7/2016 Kunugi

FOREIGN PATENT DOCUMENTS

| JP | 2013-176451 A | 9/2013 |
|---|---|---|
| JP | 2014-014413 A | 1/2014 |
| JP | 2014-042588 A | 3/2014 |
| JP | 5930111 B2 | 6/2016 |
| JP | 2016-137199 A | 8/2016 |

(Continued)

OTHER PUBLICATIONS

Notice of Reasons for Refusal issued in related Japanese Patent Application No. 2021-076901, dated May 16, 2023 (8 pages).

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An information processing device includes: a control means for causing the player to acquire a content in response to a game execution instruction from the player; an extraction means for extracting content groups of the same type from contents possessed by the player, according to an instruction from the player; a selection means for automatically selecting fusion source contents and resource contents from each of the extracted content groups; and a fusion means for collectively fusing, for each of the fusion source contents, one of the resource contents of the same type as the each of the fusion source contents. The selection means selects, as the resource contents, contents having a rarity at or below a specific level, from each of the extracted content groups.

9 Claims, 7 Drawing Sheets

(56) References Cited

FOREIGN PATENT DOCUMENTS

| | | | |
|---|---|---|---|
| JP | 2016-185282 A | 10/2016 |
| JP | 2017-148302 A | 8/2017 |
| JP | 2017-196116 A | 11/2017 |
| JP | 2018-134284 A | 8/2018 |
| JP | 2019-88985 A | 6/2019 |
| JP | 2019-170702 A | 10/2019 |
| JP | 6604420 B1 | 11/2019 |
| JP | 2021-122696 A | 8/2021 |

OTHER PUBLICATIONS

Notice of Preliminary Rejection issued in related Korean Patent Application No. 10-2022-7028406, dated Apr. 10, 2023 (19 pages).

1st Office Action issued in the counterpart Chinese Patent Application No. 202180027540.7 dated Apr. 21, 2023 (16 pages).

International Search Report issued in International Application No. PCT/JP2021/004077, dated Apr. 27, 2021 (7 pages).

Written Opinion issued in International Application No. PCT/JP2021/004077, dated Apr. 27, 2021 (5 pages).

"[Dereste] What is Star Rank? How to raise / effect and rarity limit / how to make star rank 15", Oct. 12, 2017, <URL: https://xn--zck0ab2mr42rre5d.com/star-rank.html>, [retrieved on Apr. 20, 2021] (12 Pages).

"Lesson, Imus Dereste Walkthrough Summary Wiki [Idolmaster Cinderella Girls Starlight Stage]", Sep. 4, 2019, Internet <URL:https://imascg-slstage-wiki.gamerch.com/%E3%83%AC%E3%83%83%E3%82%B9%E3%83%B3>, [retrieved on Apr. 20, 2021] (16 Pages).

Notification of Reasons for Refusal issued in Japanese Patent Application No. 2020-020377, dated Feb. 9, 2021 (11 pages).

Decision to Grant a Patent issued in Japanese Patent Application No. 2020-020377, dated Apr. 27, 2021 (5 pages).

\* cited by examiner

Strengthening fusion (Result)

Fusion source character strengthening result — 72

Character A1
★5

Level : 10→20
Luck : 15→16

Character B1
★5

Level : 20→32
Luck : 25→29

Character C2
★5

Level : 30→50
Luck : 40→50

INSTRUCTIONS AND INFORMATION PROCESSING DEVICE FOR GAMING

BACKGROUND

Technical Field

The present invention relates to instructions and an information processing device for gaming.

Description of Related Art

There are conventional games in which a player acquires content such as characters and items on the basis of the execution of a quest or a lottery game by the player.

In this regard, Patent Literature 1 discloses a technique for advantageously changing the parameters set for possessed content on the basis of the acquisition by the player of content of the same type as the possessed content.

Patent Literature

Patent Literature 1: Japanese Patent No. 5,930,111

With a game such as this, there is usually little advantage to a player in possessing content groups (a plurality of sets of content) of the same type. Therefore, the player usually performs an operation of selecting fusion source content and resource content from this content group, fuses the resource content with the fusion source content, and advantageously changes the parameters of the fusion source content. Here, if there are a plurality of content groups of the same type among the content possessed by the player, the player may have to perform the operation of selecting the fusion source content and the resource content for each content group, and the operation of performing this fusion takes extra time.

SUMMARY

One or more embodiments provide a technological improvement over such conventional gaming devices. In particular, content groups can be fused by a simple operation even when there is a plurality of content groups of the same type among the content possessed by a player with instructions and an information processing device according to one or more embodiments. This provides a practical, technological improvement over conventional gaming devices that would be readily appreciated by those skilled in the art. Further details regarding the various improvements and advantages will become apparent from the descriptions that follow.

According to one or more embodiments, instructions stored in a non-transitory computer-readable recording medium, cause a computer to function as: a control means for causing a player to acquire content in response to a game execution instruction from the player; an extraction means for extracting content groups of the same type from the content possessed by the player, according to an instruction from the player; a selection means for automatically selecting fusion source content and resource content from each of the extracted content groups; and a fusion means for collectively fusing, for each fusion source content, resource content of the same type with the fusion source content.

According to one or more embodiments, the fusion means changes special parameters of the fusion source content by fusing, as resource content, content of the same type with the fusion source content, and the fusion means does not change the special parameters of the fusion source content even if content of a different type is fused, as resource content, with the fusion source content.

According to one or more embodiments, the selection means selects, as the fusion source content, the content having the largest amount of change in the usage parameter, which changes according to usage in the game by the player, from among the extracted content groups.

According to one or more embodiments, the selection means selects, as the fusion source content, the content having the largest amount of change in the special parameter from among the extracted content groups.

According to one or more embodiments, the extraction means does not extract content in which the amount of change in the special parameter has reached an upper limit.

According to one or more embodiments, the selection means selects, as resource content, content having a rarity at or below a specific level, from character groups extracted by the extraction means.

According to one or more embodiments, the selection means selects the resource content in response to an operation instruction from the player that specifies the rarity.

According to one or more embodiments, the selection means selects, as resource content, content acquired by the player within a specific period from the present time, from among the extracted content groups.

According to one or more embodiments, the control means registers each set of fusion source content as fusion source content for automatic fusion, and when the player acquires content of the same type as the registered fusion source content, the fusion means automatically fuses, as resource content, the acquired content of the same type with this fusion source content.

According to one or more embodiments, the control means restricts the execution of the game when the number of sets of content possessed by the player is a specific number or more.

According to one or more embodiments, an information processing device comprises a control means (a controller) for causing a player to acquire content in response to an instruction to execute the game from the player; an extraction means (the controller) for extracting content groups of the same type from the content possessed by the player, according to an instruction from the player; a selection means (the controller) for automatically selecting fusion source content and resource content from each of the extracted content groups; and a fusion means (the controller) for collectively fusing, for each fusion source content, resource content of the same type as the fusion source content.

With configurations of one or more embodiments, even when there is a plurality of content groups of the same type among the content possessed by the player, the content groups can be fused by a simple operation.

DETAILED DESCRIPTION

Figure 1:
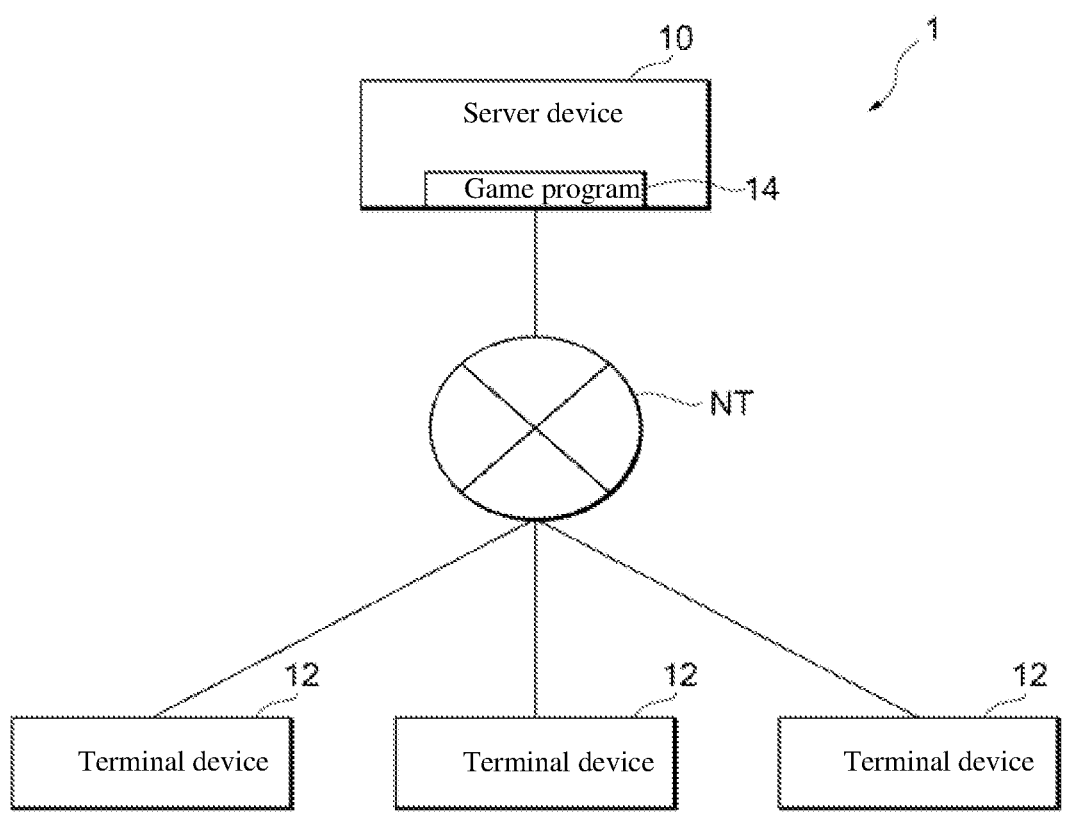
FIG. 1 is a block diagram showing an example of the overall configuration of a game system according to one or more embodiments.

Embodiments of the present invention (hereinafter referred to as "one or more embodiments or embodiments") will now be described with reference to the appended drawings. In order to facilitate an understanding of the description, components and steps that are the same in the drawings will be numbered the same whenever possible, and redundant description will be omitted.

Overall Configuration

FIG. 1 is a block diagram showing an example of the overall configuration of the game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing a game program (game instructions) 14, or the game program 14 itself, to the player of each terminal device 12 via the communication network NT. In one or more embodiments, the server device 10 provides the game program 14 itself to the players of the terminal devices 12.

Each terminal device 12 is an information processing device belonging to a player, and is an information processing device that provides a game to a player by executing the game program 14 received from the server device 10 after the program (instructions) has been installed. Examples of these terminal devices 12 include video game machines, arcade game machines, mobile phones, smartphones, tablets, personal computers, and various other such devices.

Hardware Configuration

Figure 2:
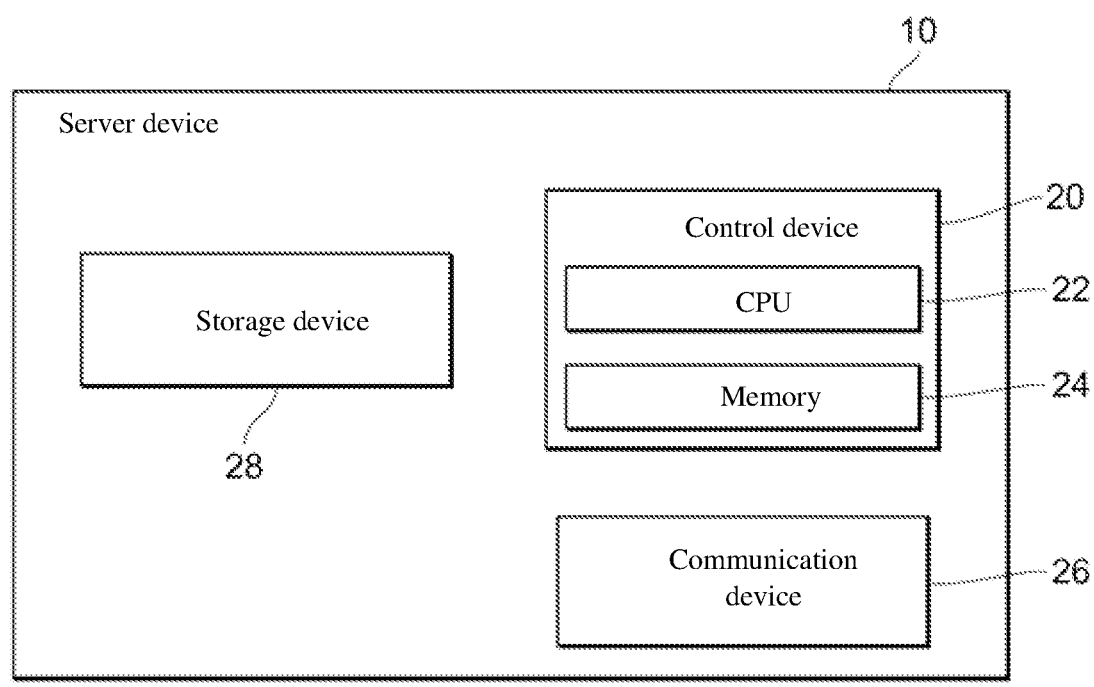
FIG. 2 is a diagram schematically showing an example of the hardware configuration of a server device according to one or more embodiments.

FIG. 2 is a diagram schematically showing an example of the hardware configuration of the server device 10.

As shown in FIG. 2, the server device 10 comprises a control device 20, a communication device 26, and a storage device 28. The control device 20 primarily comprises a CPU (central processing unit) 22 and a memory 24.

In the control device 20, the CPU 22 functions as various functional means by executing specific programs (instructions) stored in the memory (including a non-transitory computer-readable recording medium) 24, the storage device 28 (including a non-transitory computer-readable recording medium), or the like. These functional means will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of program (instructions) and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising an operating means, a display device, and a sound output device, for example.

Figure 3:
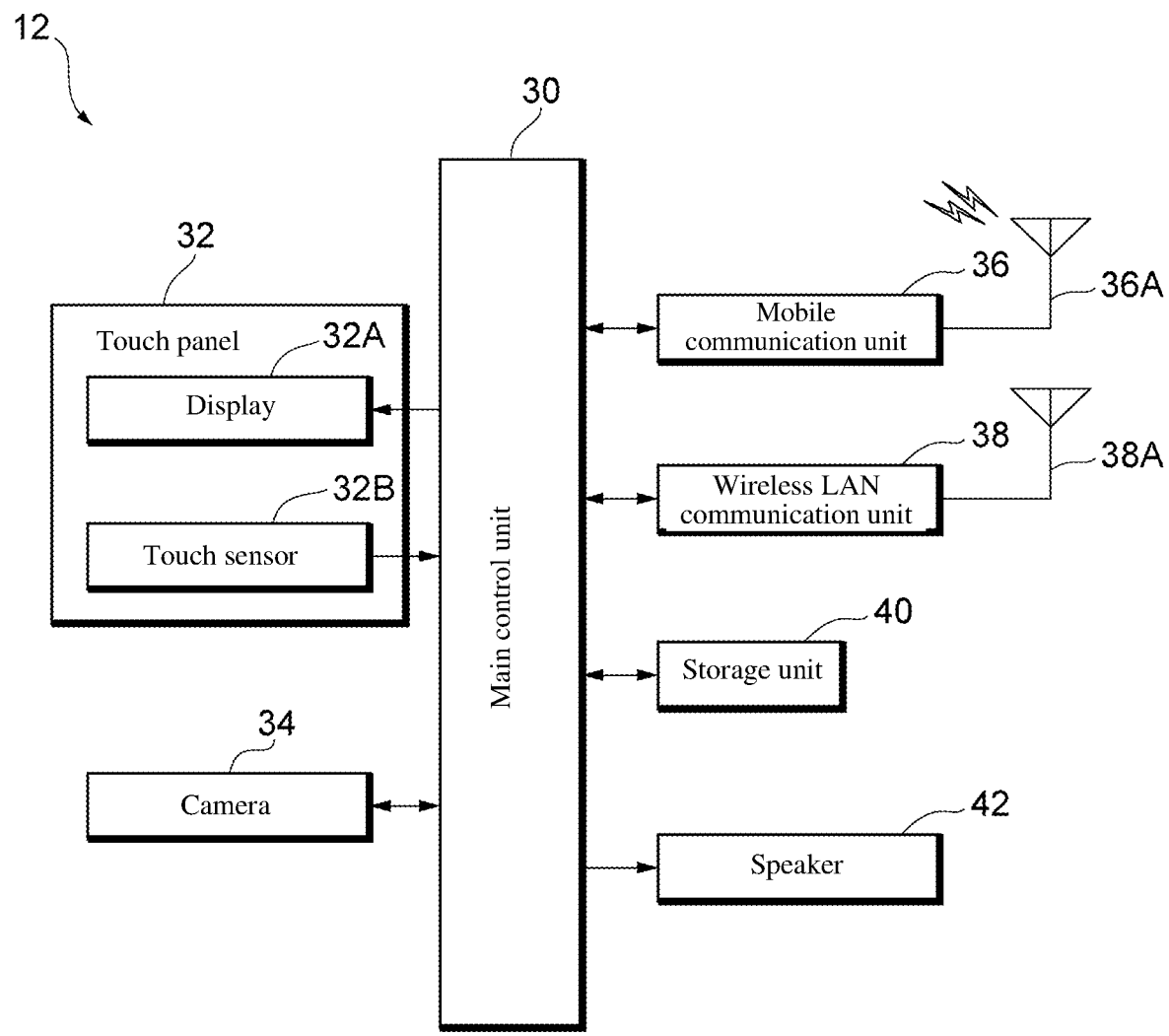
FIG. 3 is a diagram showing an example of the hardware configuration of a smartphone according to one or more embodiments as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of programs (instructions) and data, such as the game program 14, and play data indicating player information or the progress of the game in the game program 14. This play data may be stored in the server device 10.

The speaker 42 has the function of outputting game sounds and so forth.

Game Overview

The game according to one or more embodiments includes a quest or a lottery game in which a player acquires characters, as an example of content. Lottery games are sometimes referred to as gacha (loot box), raffle, summoning, etc. Quests are sometimes referred to as battle games, dungeons, explorations, etc.

In one or more embodiments, there are a plurality of types of lottery game, each of which has a different name (title). A lottery game can be selected by the player on the menu screen, etc., of the lottery game. In one or more embodiments, when the player selects a lottery game from among the several types of lottery game, a screen is displayed that allows for a one-time lottery, in which that lottery game is executed once, or continuous lottery, in which that lottery game is executed 10 times in a row. This one-time lottery is sometimes referred to as a single gacha, a one-time raffle, a one-time summoning, or the like. Also, this continuous lottery is sometimes referred to as a ten-in-a-row gacha, a ten-draw raffle, a ten-time summoning, or the like. Then, the player is allowed to acquire a randomly selected character from the lottery target character group (lottery target content group) corresponding to that lottery game, on the basis of an instruction (request) from the player to execute a one-time lottery or a continuous lottery. This lottery game is executed on the basis of the consumption of credit. A continuous lottery consumes more credit than in a one-time lottery. Examples of this credit include paid-for items (paid items) and free items (unpaid items). A paid-for item is an item that can be acquired by a player through a purchase transaction (payment in cash or electronic money, credit card payment, etc.). Examples of paid-for items include paid-for stones, paid-for gacha tickets, and the like. A free item is an item that can be acquired by the player through game play (execution of various games). For example, free items can be acquired as rewards for logging in, clearing quests, completing missions, interacting with friends, and so on. Examples of free items include free stones, free gacha tickets, and the like. Also, these paid-for items and free items can be used not only for executing lottery games, but also for various other purposes, such as restoring the current stamina value and continuing quests. Paid-for items have more value than free items. For example, in a lottery game that can be executed by consuming only paid-for items, it is easier to acquire a character with a higher rarity (rarity value) than in a lottery game that can be executed by consuming free items. Paid-for stones and free stones are sometimes referred to as "stones" without distinguishing between the two.

Also, in one or more embodiments, there are a plurality of types of quest, each of which has a different name (title). A quest can be selected by the player on the quest menu screen or the like. When one of the quests is selected by the player from among the plurality of types of quest, a screen is displayed for specifying the level of difficulty of the quest. There are, for example, beginner, intermediate, and advanced difficulty levels. The higher is the difficulty level, the higher is the number of appearances of enemy characters (number of stages) or the higher is the ability of enemy characters, and the higher is the probability of acquiring clearing rewards (for example, characters) (drop rate) and the number of rewards acquired. Then, this quest is executed on the basis of an instruction (request) by the player to execute that quest. This quest is executed on the basis of the consumption of the consumption stamina value associated with the quest, from the player's current stamina value. The higher is the difficulty level of the quest, the higher the consumption stamina value is set. Also, if the stamina associated with that quest is greater than the stamina associated with that player, the player cannot execute (play) the quest. Stamina is also sometimes referred to as life, action points (AP), battle points (BP), and so forth. The player's current stamina value may also be consumed at the end of a quest (once the quest is cleared or when the player retires).

Also, in one or more embodiments, a quest is executed in which a team composed of one or more of the characters possessed by the player plays against enemy characters that appear. In such a quest, for example, the player instructs the characters constituting his team (characters in the team) to attack and the like. Also, in this quest, the goal is for the player to reduce the hit points of the appearing enemy characters to zero or less by using the parameters and skills possessed by the characters in the team. When the quest has been cleared, the player is allowed to acquire clearing rewards, such as free stones, game coins, characters, items, and player experience points. In addition, if the quest is one that the player has already cleared, he may decide not to acquire any free stones. If the quest cannot be cleared, the player selects either to continue the quest by consuming paid-for stones, free stones, continue items, etc., or to retire from the quest. The term "continue" here means giving the right to continue playing the quest to a player who could not clear the quest.

Overview of Fusion

The "fusion" according to one or more embodiments refers to using one of the characters possessed by the player (possessed contents) as a fusion source character (fusion source contents), and training this one character using the other characters as resource characters (resource contents). The resource characters used for fusion are eliminated (deleted) from the characters possessed by the player, and the number of characters possessed by the player decreases.

Also, the fusion according to one or more embodiments includes strengthening fusion and evolutionary fusion. Strengthening fusion is fusion in which various parameters (such as level and luck) of the fusion source character are changed. Evolutionary fusion is fusion in which the fusion source character evolves (changes) into another character.

The strengthening fusion according to one or more embodiments can be executed when the player selects (specifies) the strengthening fusion menu on the management menu screen of a possessed character. In this strengthening fusion, the fusion source character and the resource character are selected from among the characters possessed by the player by a selection operation or a batch selection operation by the player. For instance, in strengthening fusion, a certain number (such as 30) or less of resource characters are selected for a single fusion source character.

Also, in the strengthening fusion according to one or more embodiments, instead of consuming a selected resource character, various parameters of the selected fusion source character are changed so as to be advantageous for the game (such as a quest). For example, when a resource character of a type different from that of the fusion source character is subjected to strengthening fusion with a fusion source character, the normal parameter (such as the level) of the fusion source character increases. The normal parameter of the fusion source character increases according to the character experience value set for the resource character. On the other hand, when a resource character of the same type as the fusion source character is subjected to strengthening fusion with a fusion source character, for example, the normal parameter and special parameter (such as luck) of the fusion source character increase. The special parameter of the fusion source character increases according to the special parameter of the resource character of the same type as the fusion source character. More specifically, if the special parameter of a resource character of the same type as the fusion source character is 10, the special parameter of the fusion source character is increased by 10 by the strengthening fusion. Consequently, even when the player acquires a character of the same type as a possessed character, the special parameters of the possessed character can be changed (increased), which provides the player with a certain level of satisfaction.

Also, the evolutionary fusion according to one or more embodiments can be executed by having the player select the evolutionary fusion menu on the management menu screen of a possessed character. In this evolutionary fusion, a fusion source character and a resource character from among the characters possessed by the player are selected when the player performs a selection operation for a fusion source character. For example, in evolutionary fusion, a certain number (such as five) of resource characters that have been associated in advance with a single fusion source character are selected for the single fusion source character.

Also, in the evolutionary fusion according to one or more embodiments, instead of consuming selected resource characters, a selected fusion source character is evolved (changed) into another character. In other words, the fusion source character becomes associated with the character ID of another character by evolutionary fusion, and the character's name, image, skill, rarity, and so forth change. This fusion source character is called a pre-evolution character. This other character is called an evolved character. In one or more embodiments, an evolved character is set to have a rarity one higher than that of a pre-evolution character, and the upper limit of the normal parameter is higher than that of the pre-evolution character, for example.

Functional Means

Figure 4:
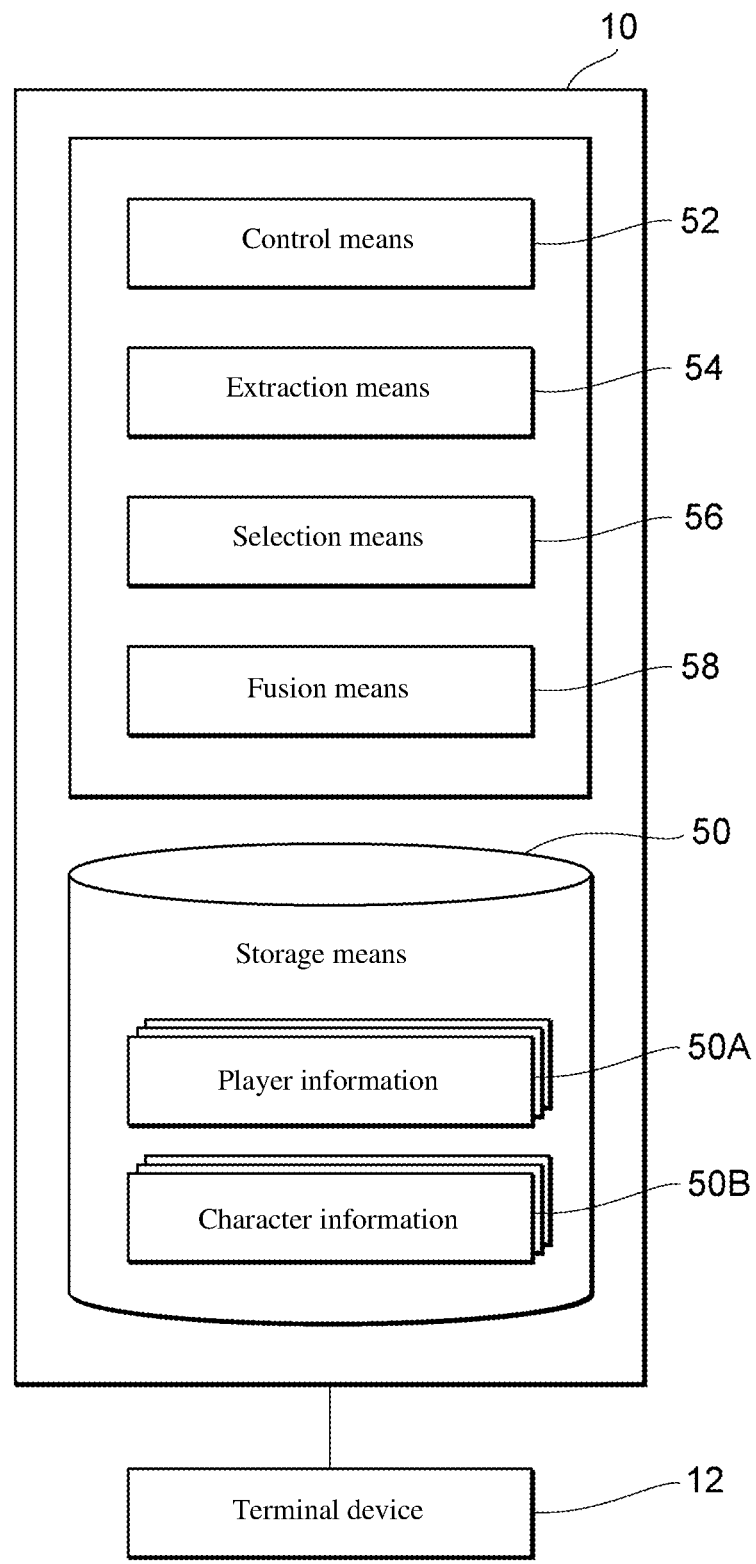
FIG. 4 is a block diagram showing an example of the functional configuration of a server device according to one or more embodiments.

FIG. 4 is a block diagram showing an example of the functional configuration of the server device 10.

As shown in FIG. 4, the server device (including a controller such as CPU 22) 10 comprises, as functional components, a storage means 50, a control means 52, an extraction means 54, a selection means 56, and a fusion means 58. The storage means (including a non-transitory computer-readable recording medium) 50 is in the form of one or more storage devices 28. Functional means other than the storage means 50 are realized when the control device 20 execute the game program 14 stored in the storage device 28 or the like.

The storage means 50 is a functional means for storing player information 50A, character information 50B, and so on.

The player information 50A is stored for each player in association with the player ID for that player. The player information 50A includes, for example, a player's name and age, possessed character information, possessed item information, and stamina information. The possessed character information includes the number of possessed characters (the total number of possessed characters), the character ID and parameters for each possessed character, and an automatic fusion flag. Parameters include normal parameters for characters, special parameters, usage parameters, and so forth. Normal parameters include level, hit points, attack power, defense power, character experience points, and so forth. The level rises (changes) when a character (fusion source character) acquires character experience value through fusion. As the level rises, the hit points, attack power, defense power, character experience value, etc., also rise (change). Special parameters include luck. Luck increases (changes) when a character of the same type (homologous) is fused with the character. For example, if the characters in a team are made up of characters with a high luck value on a quest, hit point recovery items will be more likely to appear in the quest, and the number of clearing rewards (such as characters) to be acquired will increase. Examples of characters of the same type include characters sharing the same character ID, pre-evolution characters and evolved characters, and characters sharing the same character ID of a pre-evolution character. Characters of the same type are sometimes called homologous characters. Usage parameters include the number of times a character is used, which increases (changes) according to the usage in the game. For example, the number of times of use increases (changes) depending on whether the player uses this character in a team on a quest, or fuses the character as a fusion source character. An automatic fusion flag is a flag indicating whether or not to automatically fuse a character. For example, when a player executes a game (such as a lottery game or a quest) and thereby acquires a character of the same type as a possessed character to which an automatic fusion flag is attached, the possessed character with the automatic fusion flag will be used as a fusion source character, and the acquired character of the same type will be automatically fused with the fusion source character. Possessed item information includes the number of each item possessed by the player. Examples of these items include paid-for stones and free stones. Stamina information includes the player's current stamina value and the stamina upper limit value. The current stamina value is the value that will be consumed when the player executes a quest. This current stamina value increases by a specific amount (for example, 1) when a certain amount of time has elapsed (such as 3 minutes), and is restored to the stamina upper limit value. Also, the current stamina value is restored to the same amount as the stamina upper limit value when the player consumes paid-for stones, free stones, stamina recovery items, and the like. This stamina upper limit value increases as the player rank of the player goes up. The player rank increases when the player gains player experience points, such as by playing games (quests and the like).

The character information 50B is stored for each character in association with the character ID of that character. The character information 50B includes, for example, the character name or image, rarity, initial values and limit values of various parameters, skills, and so forth. Rarity includes, for example, a number from 1 to 6. This number may be indicated by the number of stars, for example. For instance, for a character with high rarity, a limit value (upper limit value or lower limit value) of a skill or parameter that will be advantageous in the course of a game (for example, a quest) is set. More specifically, the level or luck of a character having a rarity of 4 will vary from an initial value of 1 to an upper limit of 60. On the other hand, the level or luck of a character having a rarity of 5, for example, will vary from an initial value of 1 to an upper limit of 99. For example, when the level of a character is 10, the amount of change in that level is 9. Also, the luck of a character having a rarity of 5, for example, has an upper limit of the amount of change of 98. The usage parameter (number of uses) will vary from an initial value of 0 to the upper limit of 9999.

The control means 52 is a functional means for controlling the entire game. In one or more embodiments, the control means 52 allows the player to acquire a character (content) in response to a game execution instruction from the player. For example, the control means 52 executes a single lottery game in response to the player's instruction to execute that lottery game, and allows the player to acquire a character randomly selected according to a specific lottery probability. Also, the control means 52 executes a single quest in response to the player's instruction to execute that quest, and allows the player to acquire an enemy character that has been fought against according to a specific acquisition probability (drop rate).

Also, the control means 52 registers each of the fusion source characters automatically selected by the selection means 56 as a fusion source character for automatic fusion. More specifically, the control means 52 attaches an automatic fusion flag to a possessed character (fusion source character) automatically selected by the selection means 56.

Also, the control means 52 restricts the execution of a game when the number of characters possessed by the player is at or above a specific number. This specific number is 500, for example. This specific number may be increased when the player consumes paid-for items or free items. For example, when the number of characters possessed by the player is 500 or more, the control means 52 restricts (prohibits) the execution of a lottery game or a quest so that the player does not acquire any more characters.

The extraction means 54 is a functional means for extracting one or more character groups (content groups) from the characters possessed by the player. In one or more embodiments, the extraction means 54 extracts character groups of the same type from the characters possessed by the player, according to an instruction from the player. For instance, the extraction means 54 extracts a character group A (character A1 and character A2), a character group B (character B1, character B2, and character B3), and a character group C (character C1, character C2, character C3, and character C4) from the characters possessed by the player. For example, the character A1 is an evolved character of the character A2. Also, for example, the character B1 is an evolved character of the character B2, and the character B2 is an evolved character of the character B3. Also, for example, the character C1 and the character C2 are the same characters sharing the same character ID, and are evolved characters of the character C3. Also, for example, the character C3 is an evolved character of the character C4.

Also, the extraction means 54 does not extract a character (content) for which the amount of change in various parameters has reached the upper limit. For example, the extraction means 54 excludes any characters possessed by the player whose amount of change in the normal parameter has reached the upper limit. More specifically, the extraction means 54 will not extract any characters possessed by the player whose level has reached the upper limit value of 99. Also, for example, the extraction means 54 excludes any characters possessed by the player whose amount of change in the special parameter has reached the upper limit. More specifically, the extraction means 54 will not extract any characters possessed by the player whose luck has reached the upper limit value of 99.

The selection means 56 is a functional means for automatically selecting a fusion source character and a resource character. In one or more embodiments, the selection means 56 automatically selects a fusion source character and a resource character from the character groups extracted by the extraction means 54. More specifically, the selection means 56 selects one character as a fusion source character from among the extracted character groups, and selects some or all of the characters other than said fusion source character as resource characters from among the extracted character groups.

Also, the selection means 56 automatically selects, as a fusion source character, the character having the largest amount of change in the usage parameter, which changes according to the use in the game by the player, from among the character groups extracted by the extraction means 54. In other words, the selection means 56 excludes any characters having a small amount of change in usage parameters as a fusion source character from among the extracted character groups. For example, the selection means 56 selects the character having the largest usage parameter in the character group A (such as the character A1) as a fusion source character, selects the character having the largest usage parameter in the character group B (such as the character B1) as a fusion source character, and selects the character having the largest usage parameter (such as the character C1) in the character group C as a fusion source character. If there are a plurality of characters that all have the largest amount of change in the usage parameter, the selection means 56 gives priority to characters with higher rarity, characters with larger changes in special parameters, and characters with larger changes in normal parameters (levels) in selecting one as the fusion source character.

Also, the selection means 56 automatically selects the character with the largest amount of change in the special parameter as a fusion source character from among the character groups extracted by the extraction means 54. In other words, the selection means 56 excludes any characters having a small amount of change in the special parameter from among the extracted character groups as a fusion source character. For example, the selection means 56 selects the character having the largest special parameter in the character group A (such as character A1) as a fusion source character, selects the character having the largest special parameter in the character group B (such as character B1) as a fusion source character, and selects the character having the largest special parameter in the character group C (such as character C2) as a fusion source character. If there are a plurality of characters that all have the largest amount of change in the special parameter, the selection means 56 gives priority to characters having a higher rarity, characters having a larger change in the usage parameter, and characters having a larger change in the normal parameter (level) in selecting one as the fusion source character.

Also, the selection means 56 automatically selects, as a resource character, a character other than the selected fusion source character whose rarity is no more than a specific level from among the character groups extracted by the extraction means 54. In other words, the selection means 56 excludes any characters other than the fusion source character whose rarity exceeds a specific level from among the extracted character groups for the resource characters. For example, the selection means 56 selects a character having a rarity of 4 or less that is other than the selected fusion source character in the character group A (such as character A2), a character having a rarity of 4 or less that is other than the selected fusion source character in the character group B (such as characters B2 and B3), and a character having a rarity of 4 or less that is other than the selected fusion source character in the character group C (such as characters C3 and C4) as resource characters.

Also, the selection means 56 selects a resource character that is not the fusion source character and that corresponds to the specified rarity from among the extracted character groups in response to an operation instruction specifying rarity from the player. In other words, the selection means 56 excludes any characters that are not the fusion source character and that correspond to rarities that are not specified from among the extracted character groups in response to an operation instruction specifying rarity. For example, the selection means 56 collectively selects the resource characters corresponding to the pressed operation button in response to the pressing of an operation button by the player that specifies a character having a rarity of 3 or less or a character having a rarity of 4 or less. More specifically, when there is an operation instruction specifying a character having a rarity of 3 or less, the selection means 56 collectively selects, as resource characters, any characters having a rarity of 3 or less that are not the fusion source character selected from the character group B (such as the character B3) and any characters having a rarity of 3 or less that is not the fusion source character selected from the character group C (such as the character C4). If there is an operation instruction specifying characters having a rarity of 4 or less, the selection means 56 collectively selects, as a resource character, any characters having a rarity of 4 or less that are not the fusion source character selected from the character group A (such as the character A2), any characters having a rarity of 4 or less that are not the fusion source character selected from the character group B (such as the characters B2 and character B3), and any characters having a rarity of 4 or less that are not the fusion source character selected from the character group C (such as the characters C3 and character C4).

Also, the selection means 56 selects, as resource characters, characters acquired by the player within a specific period from the present time, from among the character groups extracted by the extraction means 54. In other words, the selection means 56 excludes, as resource characters, any characters that the player has possessed for longer than a certain length of time from the present time. For example, the selection means 56 collectively selects any characters acquired within one week from the present in the character group A (such as the character A2), any characters acquired within one week from the present in the character group B (such as the character B3), and any characters acquired within one week from the present in the character group C (such as the character C4) as resource characters.

The fusion means 58 is a functional means for fusing fusion source characters and resource characters selected by the selection means 56. In one or more embodiments, for each fusion source character selected by the selection means 56, the fusion means 58 collectively fuses resource characters of the same type as this fusion source character. For example, the fusion means 58 fuses the character A2 selected as a resource character with the character A1 selected as a fusion source character in the character group A, fuses the characters B2 and character B3 selected as resource characters with the character B1 selected as a fusion source character in the character group B, and fuses the characters C3 and character C4 selected as resource characters with character C1 selected as a fusion source character in the character group C. The fusion means 58 then deletes the resource characters used for fusion from the characters possessed by the player. In other words, the fusion means 58 consumes (disposes of) the resource characters used for fusion from the characters possessed by the player.

Also, the fusion means 58 changes the special parameter of the fusion source character by fusing, as resource characters, characters of the same type with the fusion source character. For example, when the fusion means 58 fuses a resource character of the same type as the fusion source character with the fusion source character (such as in strengthening fusion), the normal parameters (such as level) and special parameters (such as luck) of the fusion source character are increased. On the other hand, the fusion means 58 will not change the special parameters of a fusion source character even if a character of a different type is fused, as a resource character, with that fusion source character. For example, when a resource character of a type different from that of the fusion source character is fused with a fusion source character (such as in strengthening fusion), the fusion means 58 raises only the normal parameters (such as level) of the fusion source character.

Also, when the player acquires a character of the same type as a fusion source character registered as fusion source content for automatic fusion, the fusion means 58 automatically fuses the acquired character of the same type, as a resource character, with the fusion source character. For example, when the player acquires a character of the same type as a character to which an automatic fusion flag is attached, among the characters possessed by the player, the fusion means 58 automatically fuses acquired characters of the same type with this character to which the automatic fusion flag is attached.

Processing Flow

Figure 5:
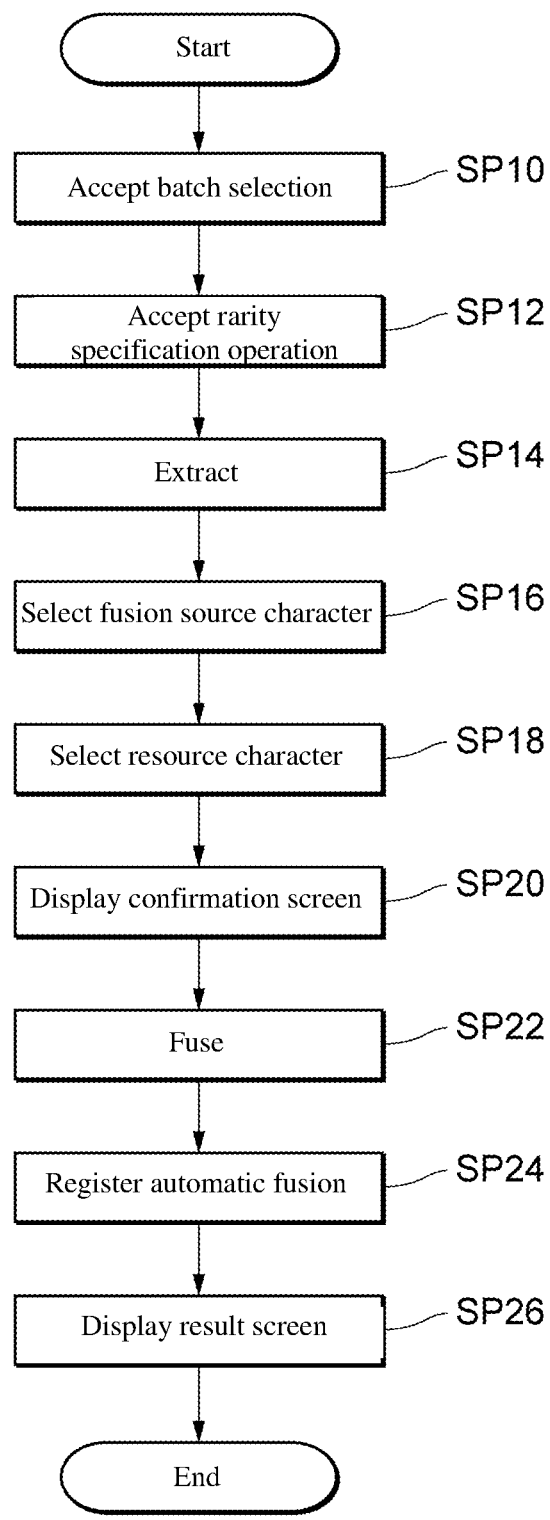
FIG. 5 is a flowchart showing an example of the flow of processing performed by each functional means shown in FIG. 4, in the game system according to one or more embodiments.

FIG. 5 is a flowchart showing an example of the flow of processing performed by the functional means shown in FIG. 4 in the game system according to one or more embodiments. Also, in the processing of the following steps, in a state in which the management menu screen for possessed characters is displayed on the touch panel 32, for example, the player performs a selection operation (instruction) to select the strengthening fusion menu, and this is started at the point when the strengthening fusion menu screen is displayed on the touch panel 32. The order and contents of the following steps can be modified as needed.

Step SP10

On the strengthening fusion menu screen, the selection means 56 receives from the player a batch selection operation for fusing (aggregating) character groups of the same type included in the possessed characters. For example, the selection means 56 receives the pressing of the batch selection button by the player on the strengthening fusion menu screen. The processing then moves to the processing of step SP12.

Step SP12

The selection means 56 receives from the player an operation instruction to specify the rarity of the character selected as a resource character from among the possessed characters. For example, the selection means 56 accepts from the player the pressing of a specification button that specifies a rarity of 3 or less, or a specification button that specifies a rarity of 4 or less. The processing then shifts to the processing of step SP14.

Step SP14

The extraction means 54 extracts character groups of the same type from the characters possessed by the player. For example, the extraction means 54 extracts from the characters possessed by the player a character group A including the characters A1 and A2, a character group B including the character B1, the character B2, and the character B3, and a character group C including the character C1, the character C2, the character C3, and the character C4. The extraction means 54 excludes from the characters possessed by the player any characters for which the amount of change in the special parameter (luck) has reached the upper limit. The processing then shifts to the processing of step SP16.

Step SP16

The selection means 56 automatically selects one character as a fusion source character from each character group extracted in step SP14. For example, the selection means 56 selects the character with the largest amount of change in the special parameter from each extracted character group as the fusion source character to be selected. More specifically, the selection means 56 automatically selects as fusion source characters the character A1 from the character group A, the character B1 from the character group B, and the character C2 from the character group C. The processing then shifts to the processing of step SP18.

Step SP18

The selection means 56 automatically selects no more than a certain number of characters (such as 5) as resource characters from among the character groups extracted in step SP14. For example, the selection means 56 removes the fusion source character selected in step SP16 from each extracted character group, and then selects a character of the rarity specified in step SP12 as the resource character to be selected. More specifically, when there is an operation instruction to specify a character having a rarity of 4 or less in step SP12, the selection means 56 collectively selects the character A2 from the character group A, the character B2 and the character B3 from the character group B, and the character C3 and the character C4 from the character group C as resource characters. The processing then shifts to the processing of step SP20.

Step SP20

The control means 52 displays on the touch panel 32 a confirmation screen 60 for fusing the resource characters selected in step SP18 with the fusion source characters selected in step SP16.

Figure 6:
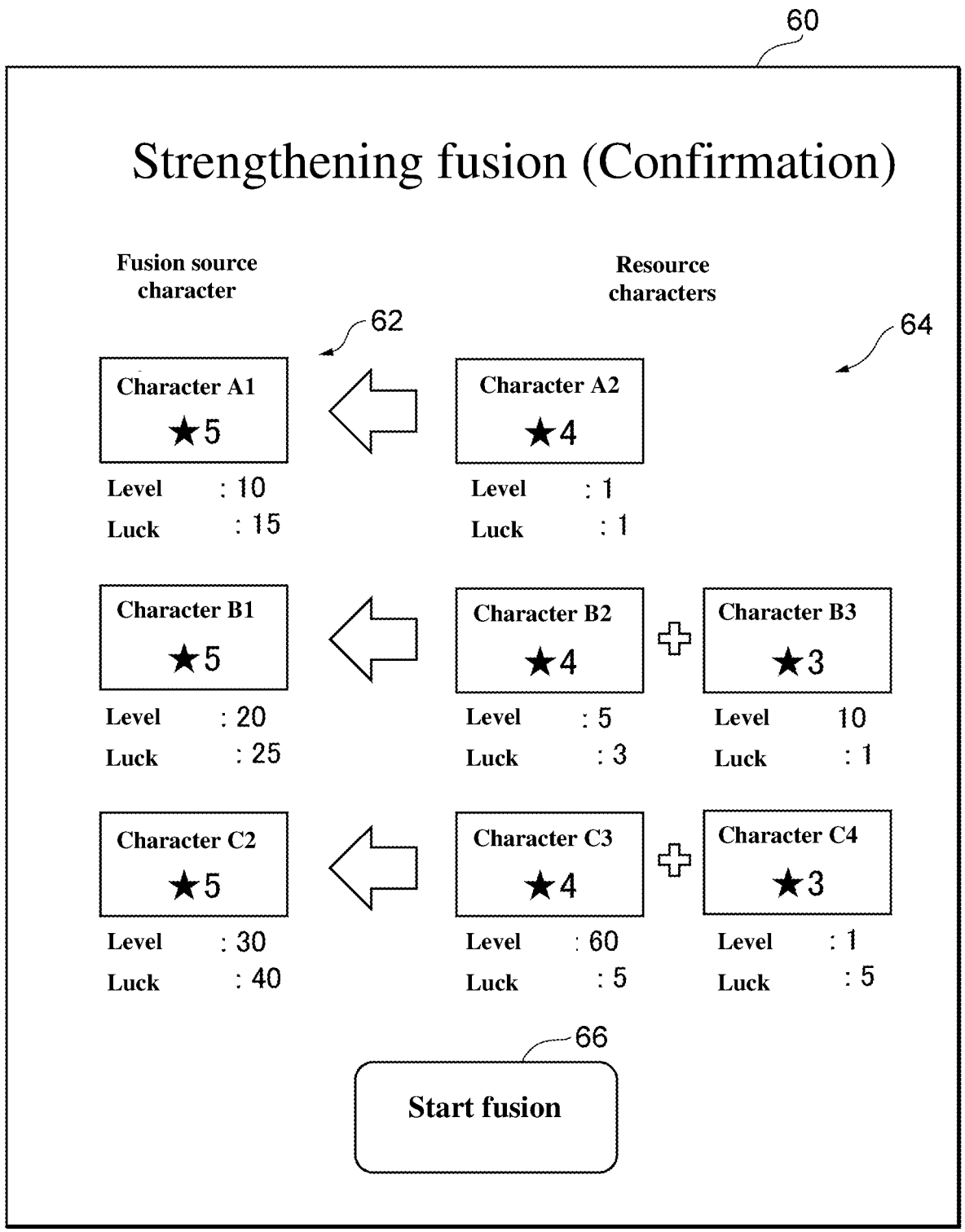
FIG. 6 is a diagram showing an example of a confirmation screen in the strengthening fusion according to one or more embodiments.

FIG. 6 is a diagram showing an example of the confirmation screen 60 in the strengthening fusion according to one or more embodiments.

As shown in FIG. 6, the confirmation screen 60 is provided with a fusion source character information area 62, a resource character information area 64, and a fusion instruction button 66. The fusion source character information area 62 shows the character selected as the fusion source character from each character group. The resource character information area 64 shows no more than a certain number of characters selected as resource characters from each character group. The fusion instruction button 66 is used to issue an instruction for the strengthening fusion of the selected resource characters with the selected fusion source characters.

Returning to FIG. 5, the processing shifts to the processing of step SP22.

Step SP22

In response to the pressing of the fusion instruction button on the confirmation screen by the player, the fusion means 58 fuses each of the resource characters selected in step SP18 with each of the fusion source characters selected in step SP16. That is, the fusion means 58 changes the parameters of the fusion source characters instead of eliminating (deleting) each of the resource characters from the characters possessed by the player. More specifically, instead of fusing the character A2 with the character A1 and deleting the character A2 from the possessed characters, the fusion means 58 raises the normal parameters and the special parameters of the character A1. Also, instead of fusing the character B2 and the character B3 with the character B1 and deleting the character B2 and the character B3 from the possessed characters, the fusion means 58 raises the normal parameters and the special parameters of the character B1. Also, instead of fusing the character C3 and the character C4 with the character C2 and deleting the character C3 and the character C4 from the possessed characters, the fusion means 58 raises the normal parameters and the special parameters of the character C2. The processing then shifts to the processing of step SP24.

Step SP24

The control means 52 registers each character used as a fusion source character in step SP22 as a fusion source character for automatic fusion. More specifically, the control means 52 attaches an automatic fusion flag to the character A1, the character B1, and the character C2 in the possessed character information of the player information 50A. The processing then shifts to the processing of step SP26.

Step SP26

The control means 52 displays on the touch panel 32 a result screen 70 showing the result of the fusion performed in step SP22.

Figure 7:
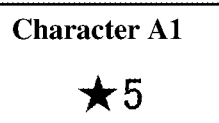
FIG. 7 is a diagram showing an example of a result screen in the strengthening fusion according to one or more embodiments.
Figure 7:
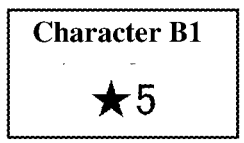
Figure 7:
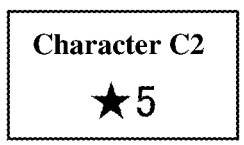

FIG. 7 is a diagram showing an example of the result screen 70 in the strengthening fusion according to one or more embodiments.

As shown in FIG. 7, the result screen 70 is provided with a strengthening result information area 72. The strengthening result information area 72 shows the result of strengthening (training) of each of the fusion source characters. For example, it is shown in the strengthening result information area 72 that a normal parameter (level) and a special parameter (luck) of each of the fusion source characters have changed (increased).

The series of processing shown in FIG. 5 is then ended.

Effect

As in the embodiments given above, a computer is made to function as a control means 52 for allowing the player to acquire content in response to an instruction to execute the game from the player; an extraction means 54 for extracting each of the content groups of the same type from the content possessed by the player, according to an instruction from the player; a selection means 56 for automatically selecting fusion source content and resource content from each of the extracted content groups; and a fusion means 58 for collectively fusing, for each fusion source content, resource content of the same type as the fusion source content.

With this configuration, even if there are a plurality of content groups of the same type among the content possessed by the player, fusion source content and resource content can be automatically selected from each content group and fused collectively. Therefore, the player can fuse possessed content of the same type with each other by a simple operation.

Also, in one or more embodiments, the fusion means 58 changes the special parameters of fusion source content by fusing, as resource content, content of the same type with the fusion source content, and the fusion means 58 will not change the special parameters of fusion source content even if content of a different type is fused, as resource content, with the fusion source content.

With this configuration, the player can collectively change the special parameters of each content group of the same type with a simple operation, so the game can proceed more advantageously.

Also, in one or more embodiments, the selection means 56 selects, as fusion source content, the content having the largest amount of change in the usage parameter, which varies according to usage in the game by the player, from among the extracted content groups.

With this configuration, each of the possessed contents used by the player in a game can be automatically selected as fusion source content, and these can all be fused together. Therefore, the player can change the special parameters of each of the most frequently used contents from among the possessed contents without having to perform an operation to select each content as the fusion source content, and this allows the fusion desired by the player to be carried out by a simple operation.

Also, in one or more embodiments, the selection means 56 selects, as fusion source content, the content having the largest amount of change in special parameters, from among the extracted content groups.

With this configuration, the player can automatically select, as fusion source content, each of the possessed contents whose special parameters are changed the most, and fuse them all together. Therefore, the player can change the special parameters of each of the contents without having to perform an operation to select as the fusion source content a content whose special parameters are changed the most from among the possessed contents, and this allows the fusion desired by the player to be carried out by a simple operation.

Also, in one or more embodiments, the extraction means 54 will not extract content whose amount of change in a special parameter has reached an upper limit.

With this configuration, content whose amount of change in a special parameter has already reached the upper limit will not be selected as fusion source content or resource content, so the player does not have to perform any unnecessary fusion. This allows the fusion desired by the player to be carried out by a simple operation.

Also, in one or more embodiments, the selection means 56 selects, as resource content, content having a rarity of no more than a specific level from among the character groups extracted by the extraction means 54.

With this configuration, the player can collectively dispose of, as resource content, any content having a low rarity, i.e., which is easy to acquire, and can keep any content having a high rarity, i.e., which is more difficult to acquire, as possessed content. Consequently, the player can collectively dispose of the low-rarity possessed contents, and can change the special parameters of each of the fusion source contents all at once, and this allows the fusion desired by the player to be carried out by a simple operation.

Also, in one or more embodiments, the selection means 56 selects resource content according to an operation instruction from the player to specify the rarity.

With this configuration, the player can select the resource content to be fused for each fusion source content all at once by issuing an operation instruction to specify the rarity. Also, because the player can choose the rarity of content to be disposed of as resource content according to the number of possessed contents, the skill level, and so forth, this allows the fusion desired by the player to be carried out by a simple operation.

Also, in one or more embodiments, the selection means 56 selects, as resource content, the content acquired by the player within a specific period from the present time, from among the extracted content groups.

With this configuration, the player can dispose of content acquired within a specific period from the present time, as resource content, and can keep necessary content possessed by the player for a longer period than this specific period, as possessed content. Therefore, if there is content of the same type as the possessed content among the content acquired within a specific period from the present time, the player can collectively dispose of this content, and can change the special parameters of possessed content all at once, which allows the fusion desired by the player to be carried out by a simple operation.

Also, in one or more embodiments, the control means 52 registers each fusion source content as fusion source content for automatic fusion, and when the player acquires content of the same type as the registered fusion source content, the fusion means 58 automatically fuses, as resource content, this acquired content of the same type with the fusion source content.

With this configuration, all the fusion source content that has been collectively fused is registered as fusion source content for automatic fusion, so even when the player acquires content of the same type as this registered fusion source content, the operation for performing fusion will take less time and effort.

Also, in one or more embodiments, the control means 52 restricts the execution of the game when the number of sets of content possessed by the player is a specific number or more.

With this configuration, the player can collectively reduce the number of sets of possessed content by a simple operation even when the execution of the game is restricted because the number of sets of possessed content is equal to or greater than a specific number.

Modification Examples

The present invention is not limited to or by the above specific examples. Specifically, even if a person skilled in the art were to make appropriate design changes to the above embodiments, that would also be included in the scope of the present invention so long as it had the features of the present invention. Also, the elements included in the above embodiments and in the modification examples given below could be combined whenever technically possible, and such combinations are also encompassed by the scope of the present invention so long as the features of the present invention are included.

For example, in the above embodiments, the selection means 56 selects fusion source characters and resource characters from among extracted character groups, but the resource characters to be selected may be changed according to the special parameters of the selected fusion source characters. For example, the selection means 56 selects a resource character from a character group so that the amount of change in a special parameter of the fusion source character does not exceed an upper limit. More specifically, when the luck of the fusion source character is 95, the selection means 56 selects a resource character so that the total luck will be 4 or less, and the luck of the fusion source character is kept from exceeding the upper limit of 99.

Also, the selection means 56 may accept a condition specification operation for selecting a fusion source character from among the extracted character groups either before or after accepting a batch selection operation from the player on the strengthening fusion menu screen. These conditions include, for example, that the usage parameter be the highest, that the special parameter be the highest, or that the rarity be the highest. In this case, the selection means 56 selects the fusion source character from among the extracted character groups according to the condition specified in the operation in step SP16.

Also, the selection means 56 may accept a condition specification operation for selecting a resource character from among the extracted character groups before accepting a batch selection operation from the player on the strengthening fusion menu screen. These conditions include, for example, that the usage parameter be a certain number (such as 1) or less, that the special parameter be a certain number (such as 2) or less, and that the rarity be a certain number (such as 4) or less. In this case, the selection means 56 selects a resource character from among the extracted character groups according to the condition accepted by the specification operation in step SP16.

Also, the selection means 56 may exclude a selected resource character from consideration for selection, in response to an operation instruction from the player. For example, the selection means 56 will not use a displayed resource character if that resource character has been tapped or swiped by the player in a state in which the confirmation screen is displayed in strengthening fusion.

Also, in the above embodiments, the fusion means 58 consumes (disposes of) resource characters in fusion, but content possessed by the player may also be consumed in addition to resource characters. For example, the fusion means 58 may consume coins or medals possessed by the player according to the number of resource characters.

Also, in the above embodiments, the fusion means 58 changed the luck, which is a special parameter, by fusing characters of the same type, but the special parameter may instead be skill level. For example, when the fusion means 58 fuses, as a resource character, a character whose skill is set to be the same as that of the fusion source character, the fusion means 58 raises the skill level of the fusion source character.

Also, the fusion means 58 may change the limit value of a normal parameter when a character of the same type as the fusion source character is fused as a resource character. For example, when the upper limit of the level of the fusion source character is 99, the fusion means 58 raises the upper limit of that level to 109 by fusing, as a resource character, a character of the same type with the fusion source character.

Also, in the above embodiments, it is mainly described that the fusion means 58 raises a special parameter (luck) by fusing characters of the same type, but the special parameter may instead be lowered by fusing characters of the same type. For example, if the special parameter is the number of turns in which a skill can be used, the fusion means 58 lowers the number of turns in which the skill can be used in the fusion source character by fusing characters of the same type, and reduces the number of turns until the skill can be used, to advantageously change the progress of the game. In this case, for example, the character information 50B includes 15, which is the initial value of the number of turns in which the skill can be used, and 5, which is a limit value (lower limit value). The upper limit of the amount of change in the number of turns in which this skill can be used is 10.

Also, in the above embodiments, it was mainly described that the content is a character, but the content may instead be items such as weapons or armor, or cards, avatars, coins, points, and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage means, 52 . . . control means, 54 . . . extraction means, 56 . . . selection means, 58 . . . fusion means

What is claimed is:

1. A non-transitory computer readable recording medium storing a program that causes a computer to function as:
a control device that:
causes a player to acquire a content in response to a game execution instruction from the player;
in response to an instruction from the player, extracts content groups, each consisting of contents of the same type, from contents possessed by the player;
automatically selects fusion source contents from each of the extracted content groups;
automatically selects resource contents having a rarity at or below a specific level that correspond to a remainder of each of the extracted content groups from which the fusion source contents and a content having a rarity exceeding the specific level are excluded; and
collectively fuses, with each of the fusion source contents, at least one of the resource contents that is the same type as the each of the fusion source contents.

2. A non-transitory computer readable recording medium storing a program that causes a computer to function as:
a control device that:
causes a player to acquire a content in response to a game execution instruction from the player;
in response to an instruction from the player, extracts content groups each consisting of contents of the same type from contents possessed by the player;
automatically selects fusion source contents from each of the extracted content groups;
automatically selects resource contents having a rarity at or below a specific level that correspond to a remainder of each of the extracted content groups from which the fusion source contents and a content having a rarity exceeding the specific level are excluded;
outputs a confirmation screen showing at least one of the resource contents that is the same type as each of the fusion source contents, wherein the at least one of the resource contents are selected to be fused with the each of the fusion source contents; and
collectively fuses, with the each of the fusion source contents, the at least one of the resource contents of the same type.

3. The non-transitory computer readable recording medium according claim 1, wherein the control device restricts the execution of the game when the number of the contents possessed by the player is a specific number or more.

4. The non-transitory computer readable recording medium according claim 2, wherein the control device restricts the execution of the game when the number of the contents possessed by the player is a specific number or more.

5. An information processing device, comprising:
a control device that:
causes a player to acquire a content in response to a game execution instruction from the player;
in response to an instruction from the player, extracts content groups each consisting of contents of the same type from contents possessed by the player;
automatically selects fusion source contents from each of the extracted content groups;
automatically selects resource contents having a rarity at or below a specific level that correspond to a remainder of each of the extracted content groups from which the fusion source contents and a content having a rarity exceeding the specific level are excluded; and
collectively fuses, with each of the fusion source contents, at least one of the resource contents that is the same type as the each of the fusion source contents.

6. An information processing device, comprising:
a control device that:
causes a player to acquire a content in response to a game execution instruction from the player;
in response to an instruction from the player, extracts content groups each consisting of contents of the same type from contents possessed by the player;
automatically selects fusion source contents from each of the extracted content groups;

automatically selects resource contents having a rarity at or below a specific level that correspond to a remainder of each of the extracted content groups from which the fusion source contents and a content having a rarity exceeding the specific level are excluded;

outputs a confirmation screen showing at least one of the resource contents that is the same type as each of the fusion source contents, wherein the at least one of the resource contents are selected to be fused with the each of the fusion source contents; and collectively fuses, with the each of the fusion source contents, the at least one of the resource contents of the same type.

7. The non-transitory computer readable recording medium according claim 1, wherein the control device automatically selects the resource contents that the player acquires within a predetermined time period from a present time, and excludes, from the resource contents, a content that the player owns for a longer time than the predetermined time period.

8. The non-transitory computer readable recording medium according claim 1, wherein each of the fusion source contents has a normal parameter including a level, and a special parameter including a luck, and upon collectively fusing, the control device increases both of the normal and special parameters.

9. The non-transitory computer readable recording medium according claim 2, wherein the confirmation screen is configured to receive an instruction to execute fusing, and upon receiving the instruction via the confirmation screen, the control device collectively fuses, with the each of the fusion source contents, the at least one of the resource contents of the same type.

* * * * *